US007865691B2

(12) United States Patent
Peled et al.

(10) Patent No.: US 7,865,691 B2
(45) Date of Patent: *Jan. 4, 2011

(54) VIRTUAL ADDRESS CACHE AND METHOD FOR SHARING DATA USING A UNIQUE TASK IDENTIFIER

(75) Inventors: Itay Peled, Herzelia (IL); Moshe Anschel, Kfar-Saba (IL); Moshe Bachar, Tel Aviv-Yaffo (IL); Jacob Efrat, Kfar-Saba (IL); Alon Eldar, Ra'anana (IL); Yakov Tokar, Ha'eshel (IL)

(73) Assignee: Freescale Semiconductor, Inc., Austin, TX (US)

( * ) Notice: Subject to any disclaimer, the term of this patent is extended or adjusted under 35 U.S.C. 154(b) by 407 days.

This patent is subject to a terminal disclaimer.

(21) Appl. No.: 11/574,474

(22) PCT Filed: Aug. 31, 2004

(86) PCT No.: PCT/EP2004/011075

§ 371 (c)(1),
(2), (4) Date: Feb. 28, 2007

(87) PCT Pub. No.: WO2006/024323

PCT Pub. Date: Mar. 9, 2006

(65) Prior Publication Data

US 2007/0294504 A1     Dec. 20, 2007

(51) Int. Cl.
*G06F 12/08*     (2006.01)
(52) U.S. Cl. ............... 711/203; 711/147; 711/E12.038
(58) Field of Classification Search .................. 711/203
See application file for complete search history.

(56) References Cited

U.S. PATENT DOCUMENTS 6,779,085 B2 * 8/2004 Chauvel ..................... 711/135

(Continued)

FOREIGN PATENT DOCUMENTS

DE         3832912 C2     5/1989

(Continued)

OTHER PUBLICATIONS

PCT International Search Report and Written Opinion PCT/EP2004/011075 dated Apr. 26, 2005.

(Continued)

*Primary Examiner*—Hetul Patel

(57) ABSTRACT

A virtual address cache and a method for sharing data. The virtual address cache includes: a memory, adapted to store virtual addresses, task identifiers and data associated with the virtual addresses and the task identifiers; and a comparator, connected to the memory, adapted to determine that data associated with a received virtual address and a received task identifier is stored in the memory if at least a portion of the received virtual address equals at least a corresponding portion of a certain stored virtual address and a stored task identifier associated with the certain stored virtual address indicates that the data is shared between multiple tasks. The method includes: receiving a virtual address and a task identifier for addressing data; determining as to whether the data is stored in a memory based upon a comparison of at least a portion of the received virtual address with at least a portion of an address associated with data stored in memory and based upon a fulfillment of the following criterion: a stored task identifier associated with the certain stored virtual address indicates that the data is shared between multiple tasks.

13 Claims, 4 Drawing Sheets

U.S. PATENT DOCUMENTS

2002/0065980 A1   5/2002   Lasserre et al.
2003/0182512 A1   9/2003   Hammarlund et al.
2003/0196048 A1   10/2003  McAllister

FOREIGN PATENT DOCUMENTS

EP   0442474 B1   7/1997
EP   1215582 A1   6/2002
EP   1215583 A1   6/2002

OTHER PUBLICATIONS

EPC Appl. No. 04822269.9 Office Action—Rejection dated Jun. 26, 2007.

* cited by examiner

VIRTUAL ADDRESS CACHE AND METHOD FOR SHARING DATA USING A UNIQUE TASK IDENTIFIER

FIELD OF THE INVENTION

The present invention relates to a virtual address cache and a method for sharing data stored in a virtual address cache.

BACKGROUND OF THE INVENTION

Digital data processing systems are used in many applications including for example data processing systems, consumer electronics, computers, cars etc. For example, personal computers (PCs) use complex digital processing functionality to provide a platform for a wide variety of user applications.

Digital data processing systems typically comprise input/output functionality, instruction and data memory and one or more data processors, such as a microcontroller, a microprocessor or a digital signal processor.

An important parameter of the performance of a processing system is the memory performance. For optimum performance, it is desired that the memory is large, fast and preferably cheap. Unfortunately these characteristics tend to be conflicting requirements and a suitable trade-off is required when designing a digital system.

In order to improve memory performance of processing systems, complex memory structures which seek to exploit the individual advantages of different types of memory have been developed. In particular, it has become common to use fast cache memory in association with larger, slower and cheaper main memory.

For example, in a PC the memory is organized in a memory hierarchy comprising memory of typically different size and speed. Thus a PC may typically comprise a large, low cost but slow main memory and in addition have one or more cache memory levels comprising relatively small and expensive but fast memory. During operation data from the main memory is dynamically copied into the cache memory to allow fast read cycles. Similarly, data may be written to the cache memory rather than the main memory thereby allowing for fast write cycles.

Thus, the cache memory is dynamically associated with different memory locations of the main memory and it is clear that the interface and interaction between the main memory and the cache memory is critical for acceptable performance. Accordingly significant research into cache operation has been carried out and various methods and algorithms for controlling when data is written to or read from the cache memory rather than the main memory as well as when data is transferred between the cache memory and the main memory have been developed.

Typically, whenever a processor performs a read operation, the cache memory system first checks if the corresponding main memory address is currently associated with the cache. If the cache memory contains a valid data value for the main memory address, this data value is put on the data bus of the system by the cache and the read cycle executes without any wait cycles. However, if the cache memory does not contain a valid data value for the main memory address, a main memory read cycle is executed and the data is retrieved from the main memory. Typically the main memory read cycle includes one or more wait states thereby slowing down the process.

A memory operation where the processor can receive the data from the cache memory is typically referred to as a cache hit and a memory operation where the processor cannot receive the data from the cache memory is typically referred to as a cache miss. Typically, a cache miss does not only result in the processor retrieving data from the main memory but also results in a number of data transfers between the main memory and the cache. For example, if a given address is accessed resulting in a cache miss, the subsequent memory locations may be transferred to the cache memory. As processors frequently access consecutive memory locations, the probability of the cache memory comprising the desired data thereby typically increases.

To improve the hit rate of a cache N-way caches are used in which instructions and/or data is stored in one of N storage blocks (i.e. 'ways').

Cache memory systems are typically divided into cache lines which correspond to the resolution of a cache memory. In cache systems known as set-associative cache systems, a number of cache lines are grouped together in different sets wherein each set corresponds to a fixed mapping to the lower data bits of the main memory addresses. The extreme case of each cache line forming a set is known as a direct mapped cache and results in each main memory address being mapped to one specific cache line. The other extreme where all cache lines belong to a single set is known as a fully associative cache and this allows each cache line to be mapped to any main memory location.

In order to keep track of which main memory address (if any) each cache line is associated with, the cache memory system typically comprises a data array which for each cache line holds data indicating the current mapping between that line and the main memory. In particular, the data array typically comprises higher data bits of the associated main memory address. This information is typically known as a tag and the data array is known as a tag-array. Additionally, for larger cache memories a subset of an address (i.e. an index) is used to designate a line position within the cache where the most significant bits of the address (i.e. the tag) is stored along with the data. In a cache in which indexing is used an item with a particular address can be placed only within a set of lines designated by the relevant index.

To allow a processor to read and write data to memory the processor will typically produce a virtual address. A physical address is an address of main (i.e. higher level) memory, associated with the virtual address that is generated by the processor. A multi-task environment is an environment in which the processor may serve different tasks at different times. Within a multi-task environment, the same virtual addresses, generated by different tasks, is not necessarily associated with the same physical address. Data that is shared between different tasks is stored in the same physical location for all the tasks sharing this data while data not shared between different tasks (i.e. private data) will be stored in a physical location that is unique to its task.

This is more clearly illustrated in FIG. 1, where the y-axis defines virtual address space and the x-axis defines time. FIG. 1 illustrates four tasks 51-54. The execution of each task requires fetching code and data. The execution of the first task 51 involves fetching private code 11, shared code 12, shared data 13 and private data 14. The execution of the second task 52 involves fetching private code 21, and shared data 22. The execution of the third task 53 involves fetching private code 31, shared code 32, shared data 34 and private data 33. The execution of the fourth task 54 involves fetching private code 41, shared data 43 and private data 42. The shared code 12 and 32 are arranged to have the same virtual addresses and the same physical addresses. The shared data 13, 22, 34 and 43 are arranged to have the same virtual addresses however the associated data stored in external memory will be stored in different physical addresses. It is noted that each box in FIG. 1 represents multiple addresses.

Consequently, a virtual address cache will store data with reference to a virtual address generated by a processor while data to be stored in external memory is stored in physical address space.

Further, a virtual address cache operating in a multi-tasking environment will have an address or tag field, for storing an address/tag associated with stored data and a task identifier field for identifying as to which task the address/tag and data are associated.

Consequently, within a multi-tasking environment a 'hit' requires that the address/tag for data stored in the cache matches the virtual address requested by the processor and the task identifier field associated with data stored in cache matches the current active task being executed by the processor.

When a processor switches from one task to another task the contents of a virtual address data cache, associated with the first task, will typically be flushed to a higher level memory and new data associated with the new task is loaded in to the virtual address cache. This enables the new task to use updated data that is shared between the two tasks. However, the need to change the memory contents when switching between tasks increases the bus traffic between the cache and the higher-level memory, and increases the complexity of the operating system in the handling of inter-process communication. This may also produce redundant time consuming 'miss' accesses to shared data after the flush. In case of shared code, flush is not needed after task switch, however this increases the footprint of shared code by needing to duplicate the shared code in the cache memory.

One solution has been to use a physical address cache where a translator translates the virtual address generated by a processor into a respective physical address that is used to store the data in the physical address cache, thereby ensuring that data shared between tasks is easily identified by its physical address.

However, the translation of the virtual address to its corresponding physical address can be difficult to implement in high-speed processors that have tight timing constraints.

It is desirable to improve this situation.

SUMMARY OF INVENTION

The present invention provides a virtual address cache and a method for sharing data stored in a virtual address cache as described in the accompanying claims.

An indication such as but not limited to a task identifier associated with shared data or shared instruction indicates that they are shared between tasks.

BRIEF DESCRIPTION OF THE DRAWINGS

The present invention will now be described, by way of example, with reference to the accompanying drawings, in which.

DETAILED DESCRIPTION OF THE DRAWINGS

The following description related to multiple data retrieval operations and to a virtual address cache that stores data. Those of skill in the art will appreciate that the disclosed systems and methods can be applied mutates mutandis to instruction retrieval, virtual address cache that stores instructions, and even to a combination of data and instruction retrieval and to cache modules that store both instructions and data.

Figure 2:
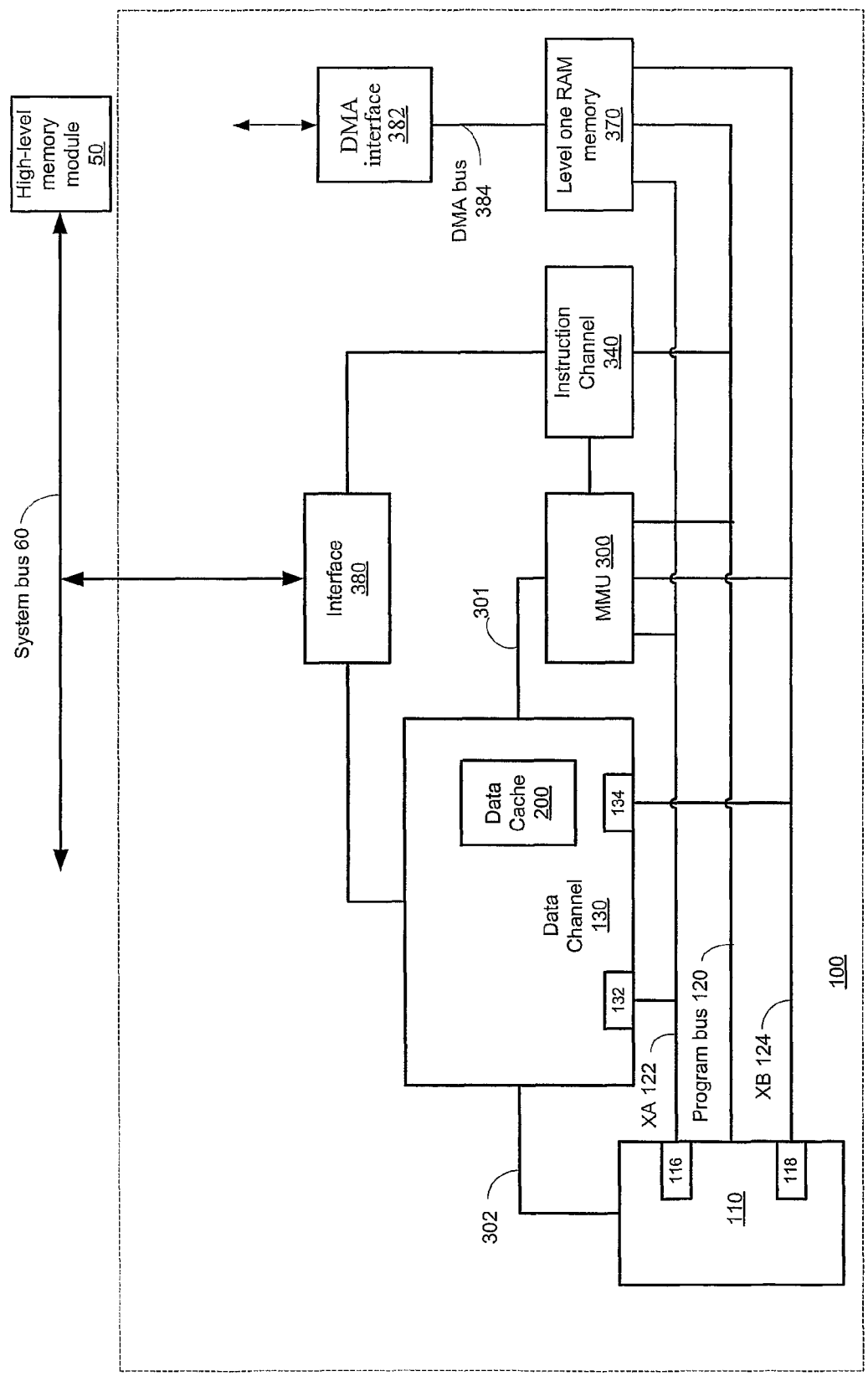
FIG. 2 illustrates an apparatus, according to an embodiment of the invention.

FIG. 2 illustrates an apparatus 100, according to an embodiment of the invention. Apparatus 100 includes a processor 110, a data channel 130, a memory controller such as Memory Management Unit (MMU) 300, an instruction channel 340, a level-one RAM memory 370 as well as an interface unit 380. Apparatus 100 is connected to an additional memory module, such as high-level memory module 50, via system bus 60.

Processor 110 and the instruction channel 340 are connected to a single program bus 120. Processor 110 has a first data port 116 and a second data port 118. The first data port 116 is connected, via a first data bus (XA) 122 to a first port 132 of the data channel 130, to the MMU 300 and to the level-one RAM memory 370. The second data port 118 is connected, via a second data bus (XB) 124 to a second port 134 of the data channel 130, to the MMU 300 and to the level-one RAM memory 370.

The data channel 130 is connected via a data fetch bus 126 to an interface 380 that in turn is connected the high-level memory module 50. It is noted that the additional memory can be a part of a multi-level cache architecture, whereas the virtual address cache such as data cache module 200 is the first level cache module and the additional memory is a level two cache memory. The additional memory can also be a part of an external memory that is also referred to as a main memory. Data channel 130 includes a data cache module 200, and can optionally include additional devices such as buffers and the like (not shown). When a cache miss occurs the data channel retrieves data via interface unit 380.

MMU 300 is adapted to supply program and data hardware protection, and to perform high-speed virtual address to physical address translation. MMU 300 is also capable of providing various cache and bus control signals. The virtual address is an address that is generated by processor 100 and as viewed by code that is executed by processor 110. The physical address is used to access the various higher-level memory banks such as the level-one RAM memory 370. Once processor 110 requests data from data cache 200 MMU 300 sends a task identifier associated to the data request (or more generally to the task that is being executed by processor 100) to the data cache 200. Typically, the processor 100 executes an operating system that sends updated task identifiers to MMU 300.

MMU 300 is adapted to define (or alternatively to receive such a definition from another device) which data is shared and also which instruction is shared. MMU 300 is capable of sending a shared data indication to data cache 200 and also of altering a task identifier stored at the data cache 200. Said alteration may initiated by sending a control signal to the data cache 200 or even by sending the unique task identifier to the data cache 200.

Processor 110 is capable of issuing two data requests simultaneously, via buses XA 122 and XB 124. The data channel 130 processes these requests to determine if one or more cache hit occurred. Basically, the data channel 130 can decide that the two data requests resulted in a cache hit, the both request resulted in a cache miss or that one request resulted in a cache hit while the other resulted in a cache miss.

Figure 3:
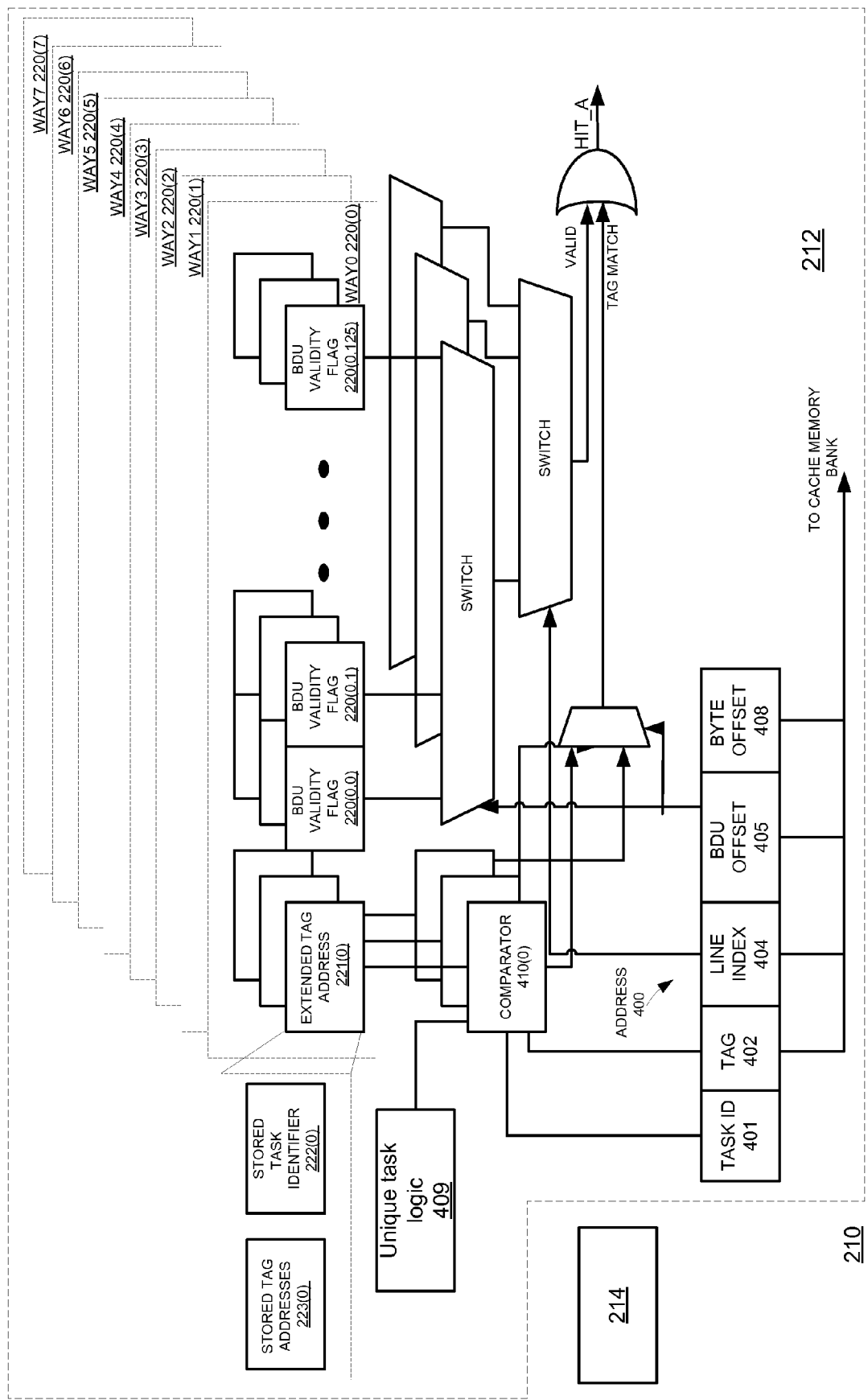
FIG. 3 is a schematic illustration of a cache logic, according to an embodiment of the invention.

FIG. 3 is a schematic illustration of a portion 212 of cache logic, according to an embodiment of the invention. The cache logic 210 is capable of managing two data requests simultaneously and includes two identical portions, 212 and 214, each is capable of determining whether a single cache hit or cache miss has occurred. For simplicity of explanation only a first portion 212 of the cache logic 210 is illustrated in detail.

The cache logic portion 212 includes eight ways denoted WAY0-WAY7 220(0)-220(7). Each way stores address and status information that is associated with sixteen lines. The address information includes a tag address and the status information includes BDU validity and update information. For simplicity of information only WAY0 220(0) is illustrated in detail, while the other ways are represented by boxes 220(1)-220(7). It is noted that the cache logic portion can includes more than eight ways or 1-7 ways.

Cache logic portion 212 includes a unique task logic 409 that is capable of storing task identifier values that indicates that data associated with such task identifier is shared between multiple tasks.

Figure 1:
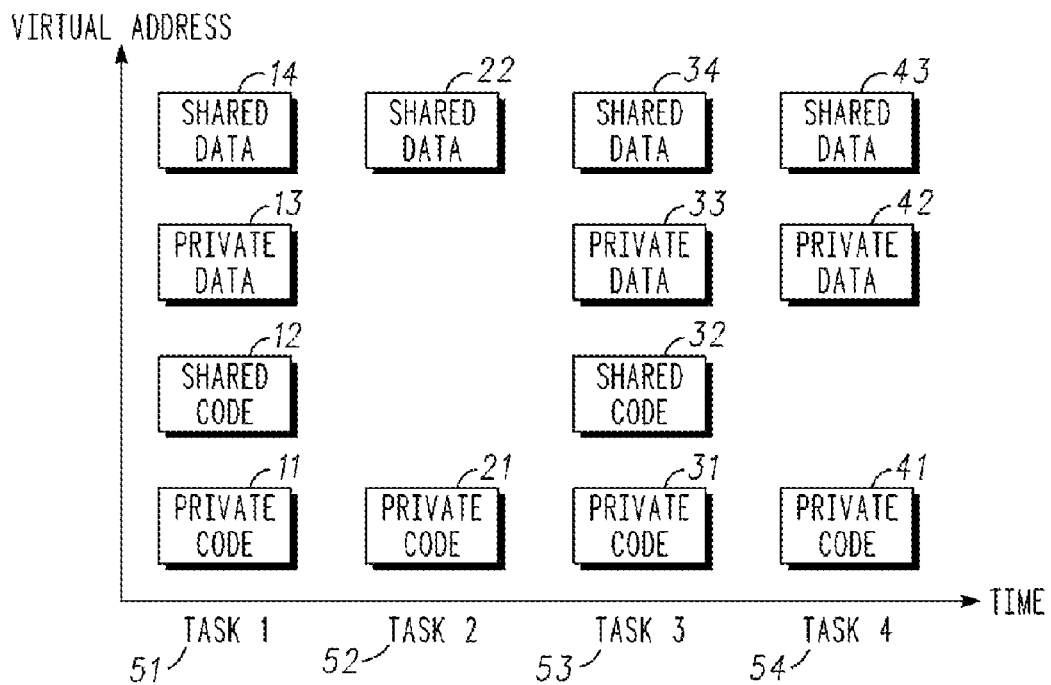
FIG. 1 illustrates a virtual address space versus time chart.

It is noted that although FIG. 1 illustrates data shared between all tasks this is not necessarily so and data can be shared between certain tasks while not being shared by other tasks. Accordingly, a unique task identifier value is allocated to each sub-group of tasks that share data.

The unique task logic 409 sends these values to comparators such as comparators 410(0)-410(9) that are able to compare a stored task identifier to the unique task identifier values to determine if data is shared.

According to another embodiment of the invention the unique task logic 409 is also capable of determining if a stored task identifier is indicative of shared data. The unique task logic 409 can include masking logic for comparing only a portion of stored task identifiers to determine if they indicate that data associated with them is shared.

The following examples better illustrate the operation of the unique task logic 409. It is assumed that the task identifier is eight bits long. If data is shared between all tasks a unique task identification value of zero can simplify the shared data determination. A NOR gate having eight inputs can receive a stored task identifier and provide an indication whether it indicates that data associated to that stored task identifier is shared. If a unique task identification value of "11111111" is selected an AND gate having eight inputs can provide a determination. In any case an eight-bit comparator can perform the comparison.

When data is shared just between a sub-group of tasks and the cache logic has to determine whether a cache hit occurs (if a stored task identifier belongs to a certain range of values) this can be implemented by masking a portion of the stored task identifier and comparing only a portion to the unique task identifier values.

It is noted that high-speed comparison methods are known in the art and can be applied by the cache logic.

Referring back to cache logic portion 212, each cache line is associated with an extended tag value and with sixteen BDU validity bits, representative of a validity of each BDU within that line. WAY0 220(0) stores sixteen extended tag addresses 221(0)-221(15), as well as sixteen sets of sixteen basic data unit (BDU) validity flags 220(0,0)-220(15,15).

An extended tag address (also referred to as stored extended tag addresses) includes a portion of a stored virtual address (usually the most significant portion) as well as a stored task identifier. For example, the extended tag address 221(0) includes a portion of the virtual address, also referred to as stored tag address 223(0) and a stored task identifier 222(0). A BDU is a basic component for data retrieval.

Each BDU can also be associated with dirty bits that indicate if a BDU was modified without being updated in a higher-level memory.

The retrieval of data from data cache 200 starts by providing to the cache logic 210 an eight-bit task identifier (from MMU 300) and address 400 (from processor 110 over the one of the data buses XA and XB). A first portion 212 of cache logic 210 processes this address and the task identifier, to determine whether the requested data is stored at the cache module (cache hit) or not (cache miss). If a cache hit occurs the requested data is sent to processor 110 over an appropriate data bus out of XA 122 or XB 124.

The address 400 is partitioned to a tag address 402, a line index 404, a BDU offset 405 and a byte offset 408. The byte offset 408 is used for data retrieval from the cache memory bank 250. An extended tag address includes said tag address 402 and the task identifier 401.

Comparators 410(0)-410(7) operate in parallel. For convenience of explanation we will refer to comparator 410(0). Comparator 410(0) receives: (a) a virtual address 400, or typically a tag address 402 that is only a portion of address 400, (b) a stored virtual address, or typically a stored tag address 223(0), (c) either a unique task identifier value from unique task logic 409 (or an indication that the data is shared), (d) a stored task identifier such as 222(0), and (e) a current task identifier, such as task identifier 401, indicating which task is being executed by processor 110.

Comparator 410(0) will determine that the requested data is stored within data cache 200 if the tag address 402 equals the stored tag address 223(0) and if one or two of the following conditions is fulfilled: (i) the received task identifier 401 equals the stored task identifier 222(0), (ii) the stored task identifier 220(0) indicates that the data is shared between multiple tasks.

According to an embodiment of the invention at a first time that processor 110 requests to retrieve certain data that is not stored within the data cache 200 this data is retrieved from an external memory. This data is usually initially stored within the data cache 200 with the task identifier that caused the cache miss. Nevertheless, if the MMU 300 determines that the data is shared it forces the cache logic portion 212 to alter the stored task identifier to a unique task identifier.

In addition, the BDU offset 405 and the line index 404 are used to retrieve a validity flag that corresponds to the requested BDU. The 4-bit line index 404 is used for selecting a set of BDU validity flags out of the sixteen sets of WAY0 220(0), while the 4-bit BDU offset 405 is used for selecting a validity flag out of the selected set of BDU validity flags.

Although the current embodiment shows the task identifier being provided by the memory controller 104 the virtual address data cache 100 could receive the task identifier from other elements within a computing system, for example the processor 101.

Figure 4:
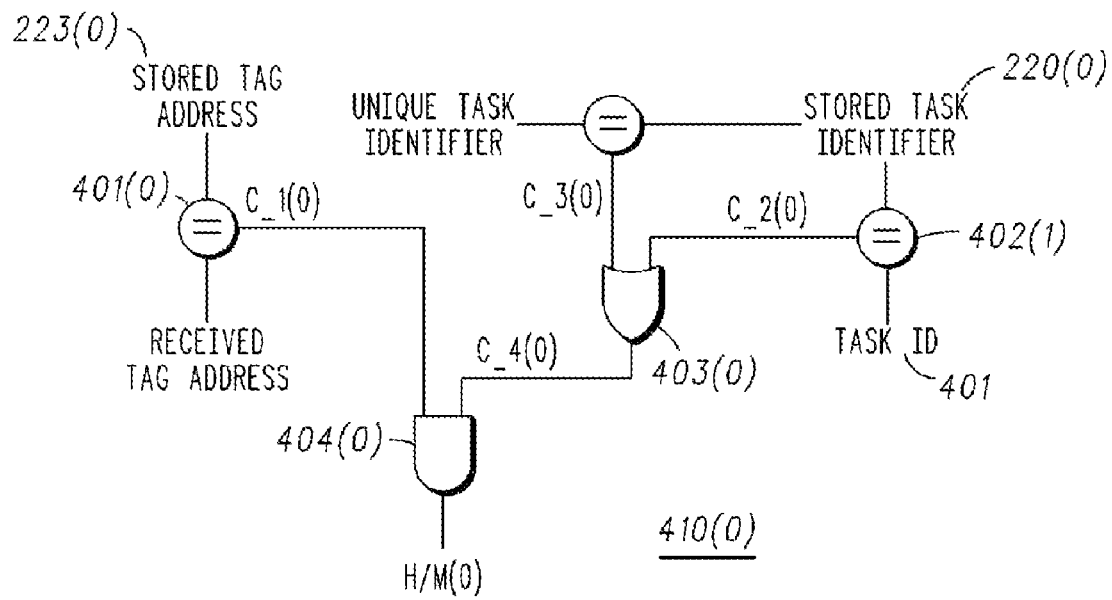
FIG. 4 illustrates various components of a comparator and its surroundings, according to an embodiment of the invention.

FIG. 4 illustrates various components of a comparator 410(0) and its surroundings, according to an embodiment of the invention.

Comparator 410(0) includes a first comparator element 401(0), a second comparator element 402(0), an OR gate 403(0), an AND gate 404(0) and a third comparator 405(0).

The first comparator element 401(0) compares the received tag address 402 to the stored tag address 223(0) to provide a first comparison signal C_1(0). The second comparator element 402(1) compares the stored task identifier 222(0) to the task ID 401 (provided by MMU 300) to provide a second comparison signal C_2(0). The stored task identifier 222(0) is compared to a unique task identifier value that is provided by unique task logic 409 to provide a second comparison signal C_3(0). As previously mentioned the unique task logic 409 can determine if the stored task identifier 220(0) indicates that the associated data is shared by other means. The OR gate 403(0) receives C_2(0) and C_3(0) and provides a fourth comparison signal C_4(0) whereas C_4(0)=C_2(0) OR C_3(0). The AND gate 404(0) receives C_1(0) and C_4(0) and provides cache hit/miss signal (H/M(0)), whereas H/M(0)=C_4(0) OR C_1(0).

All the ways operate in parallel, or more specifically the same index in all ways operate in parallel. Thus a cache hit occurs if one cache hit/miss signal indicates that a cache hit occurred and if the corresponding data is valid.

The operation of the cache logic 210 and MMU 300 is further illustrated by the following table. R_TAG is a received tag address such as tag address 402; R_T_ID is a received task identifier such as task identifier 401; and S_T_ID is a stored task identifier such as stored task identifier 221(0). C_1-C_4 are comparison signals such as those of comparator 410(0) and H/M is a cache hit/miss signal such as cache hit/miss signal H/M(0).

| # | R_TAG | R_T_ID | S_T_ID | C_1 | C_2 | C_3 | C_4 | H/M | Action |
|---|-------|--------|--------|-----|-----|-----|-----|-----|--------|
| 1 | A | 10 | 0 | 0 | 0 | 0 | 0 | Miss | -Retrieve data from external memory -MMU decides that shared, alters stored task identifier |
| 2 | B | 7 | 7 | 0 | 0 | 0 | 0 | Miss | Retrieve data from external memory |
| 3 | C | 10 | 10 | 0 | 1 | 0 | 1 | Miss | Retrieve data from external memory |
| 4 | A | 6 | 0 | 1 | 0 | 1 | 1 | Hit | Cache hit (assuming data valid) |

Figure 5:
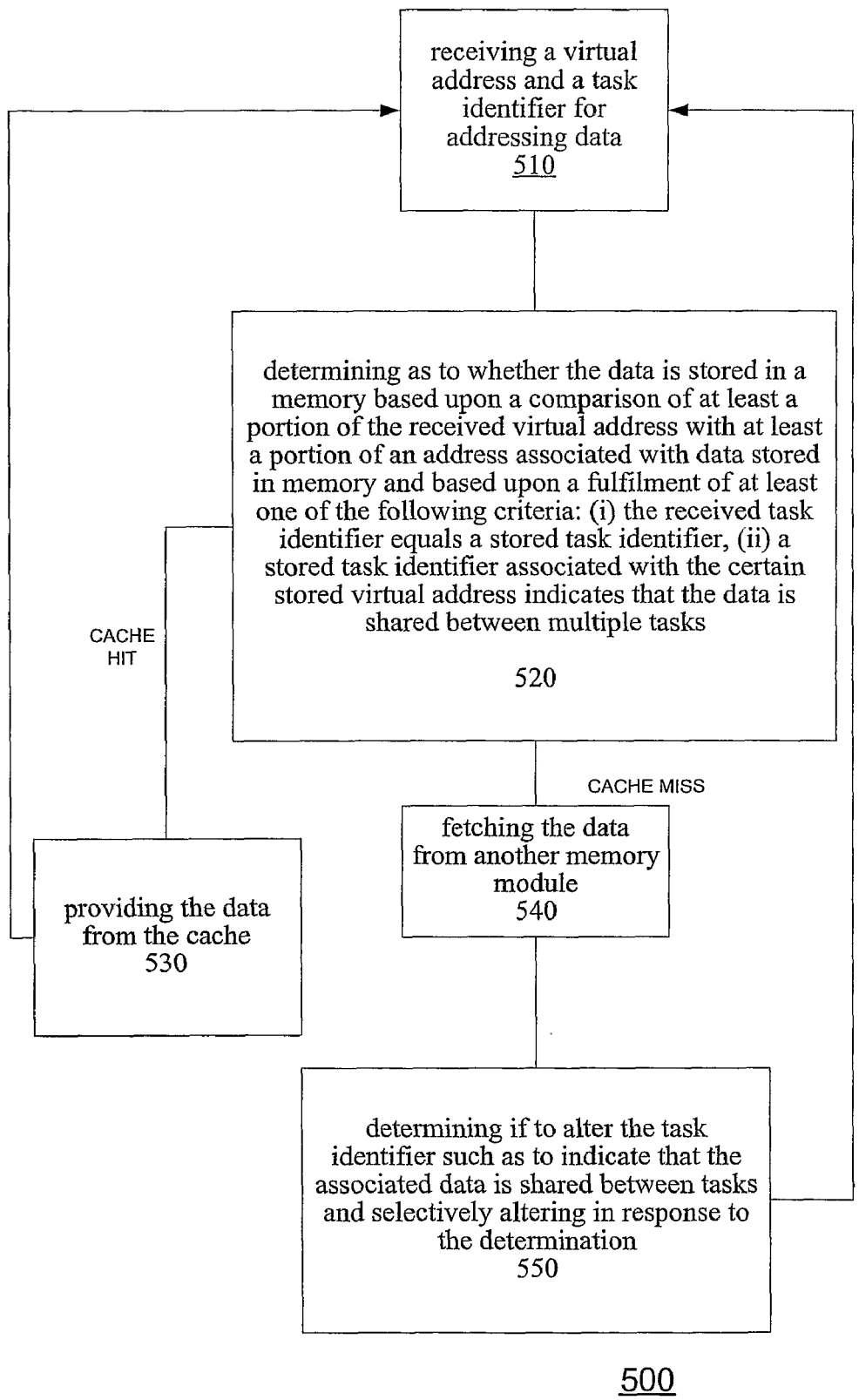
FIG. 5 is a flow chart of a method for data sharing, according to an embodiment of the invention.

FIG. 5 is a flow chart of method 500 for data sharing, according to an embodiment of the invention.

Method 500 starts by stage 510 of receiving a virtual address and a task identifier for addressing data. Referring to the example set forth in FIG. 2-4, a first portion 212 of cache logic 210 receives address 400 and task identifier 401.

Stage 510 is followed by stage 520 of determining as to whether the data is stored in a memory based upon a comparison of at least a portion of the received virtual address with at least a portion of an address associated with data stored in memory and based upon a fulfillment of at least one of the following criteria: (i) the received task identifier equals a stored task identifier, (ii) a stored task identifier associated with the certain stored virtual address indicates that the data is shared between multiple tasks. Referring to the example set forth in FIG. 2-4, each of comparators 410(0)-410(7) compares the received task identifier 401 and portions of address 400 to stored task identifiers 221(0)-221(7) and to stored tag addresses 222(0)-222(7).

Stage 520 is followed by stage 530 of providing the data from the cache, if a cache hit occurred. Stage 530 is followed by stage 510, when another request to receive data from the cache module is received.

Stage 520 is followed by stage 540 of fetching the data from another memory module, if a cache miss occurred. Stage 540 may also includes storing the data and associated tag address and task identifier. Stage 540 is followed by stage 550 of determining if to alter the task identifier such as to indicate that the associated data is shared between tasks and selectively altering in response to the determination. Stage 550 is followed by stage 510.

Conveniently, stage 520 is completed within a portion of a read cycle.

According to other embodiments of the invention a certain field, attribute or bit other than a task identifier indicates that the data is shared between multiple tasks. Conveniently, the MMU 300 provides said indication to the virtual address cache and does not later the task identifier.

Variations, modifications, and other implementations of what is described herein will occur to those of ordinary skill in the art without departing from the spirit and the scope of the invention as claimed. Accordingly, the invention is to be defined not by the preceding illustrative description but instead by the spirit and scope of the following claims.

The invention claimed is:

1. A virtual address cache comprising:
    a memory, adapted to store virtual addresses, task identifiers and data associated with the virtual addresses and the task identifiers; wherein only a value of a task identifier is indicative whether data associated with the task identifier is shared between tasks; and wherein the task identifier lacks a portion that is allocated only for indicating whether data is shared between tasks; and
    a comparator, coupled to the memory, adapted to determine that data associated with a received virtual address and a received task identifier is stored in the memory if a first criteria is fulfilled or a second criteria is fulfilled;
    wherein the first criteria is fulfilled if at least a portion of the received virtual address equals at least a corresponding portion of a certain stored virtual address and a stored task identifier associated with the certain stored virtual address indicates that the data is shared between multiple tasks;
    wherein the second criteria is fulfilled if at least the portion of the received virtual address equals the at least corresponding portion of the certain stored virtual address and the received task identifier equals a stored task identifier.

2. The virtual address cache of claim 1 wherein the comparator is adapted to provide the determination within a portion of a single read cycle.

3. The virtual address cache memory of claim 1 further adapted to receive a control signal from a memory controller and in response alter a stored task identifier to a unique task identifier that indicates that data that is associated with the virtual address is shared between multiple tasks.

4. The virtual address cache of claim 1 wherein the stored task identifier indicates that data is shared between multiple tasks if a portion of the stored task identifier has a predefined value.

5. The virtual address cache of claim 1 adapted to store data associated with at least one task out of a group of tasks.

6. The virtual address cache of claim 5 wherein the multiple tasks comprise all the group of tasks.

7. The virtual address cache of claim 5 wherein the group of tasks comprises multiple task sub-groups that share data, wherein each task sub-group that shared data is associated with a unique task identifier value, and wherein the comparator is adapted to compare between at least a portion of the stored task identifier and at least a portion of each unique task identifier.

8. A method for sharing data stored in a virtual address cache, the method comprising:

receiving a virtual address and a task identifier for addressing data; wherein only a value of a task identifier is indicative whether data associated with the task identifier is shared between tasks; and wherein the task identifier lacks a portion that is allocated only for indicating whether data is shared between tasks;

determining that the data is stored in a memory if a first criteria or a second criteria is fulfilled;

wherein the first criteria is fulfilled if at least a portion of the received virtual address equals at least a portion of an address associated with data stored in memory and a stored task identifier associated with the certain stored virtual address indicates that the data is shared between multiple tasks; and wherein the second criteria is fulfilled if at least the portion of the received virtual address equals at least the portion of the address associated with data stored in memory and the received task identifier equals the stored task identifier.

9. The method of claim 8 wherein the stage of determining is completed within a portion of a read cycle.

10. The method of claim 8 further comprising a stage of receiving a control signal from a memory controller and in response altering a stored task identifier to a unique task identifier that indicates that data that is associated with the virtual address is shared between multiple tasks.

11. The method of claim 8 wherein the stored task identifier indicates that data is shared between multiple tasks if a portion of the stored task identifier has a predefined value.

12. The method of claim 8 wherein at least one task identifier indicated that data is shared between a group of tasks.

13. The method of claim 12 wherein the group of tasks comprises multiple task sub-groups that share data, wherein each task sub-group that shared data is associated with a unique task identifier value, and wherein the determining comprises comparing between at least a portion of the stored task identifier and at least a portion of each unique task identifier.

* * * * *